Figure 1:
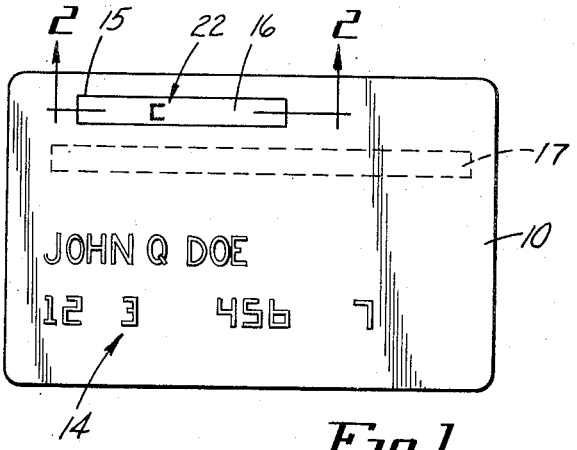
Figure 2:
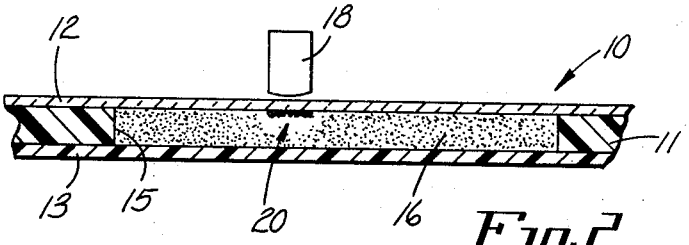

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 2, 1974

921 O.G. 10

T921,007
VISUALLY READABLE MAGNETIC CREDIT CARD STORAGE MEDIA

Jerrold S. Foley, Stow, Ohio, assignor to Addressograph-Multigraph Corporation, Cleveland, Ohio

Filed Aug. 31, 1973, Ser. No. 393,315
Int. Cl. B44c
U.S. Cl. 156—63
1 Sheet Drawing. 5 Pages Specification

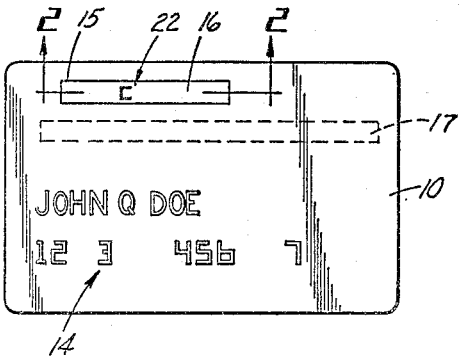

Variable information is encoded on a credit card by a method allowing visual reading. The technique involves constructing a cavity within the core of a credit card such that the laminated surfaces completely enclose a quantity of a specific paste material. This paste material includes a mixture of magnetizable iron particles suspended in an oil solution which acts as a vehicle for the iron particles. The mixture also contains titanium dioxide which is white in color and thus acts as a pigment as compared to the iron particles. A credit card thus constructed is capable of receiving and retaining information visually in accordance with the physical distribution of the iron particles. Such information would be encoded onto the credit card by moving a magnetic material, having a surface formation corresponding to the information desired to be encoded, into contact with the surface of the credit card. The magnet will cause the iron particles to congregate at the inside surface of the credit card lamination. Elimination or change of the encoded information may be effected by subjecting the credit card, with its fluid paste, to an alternating magnetic current thus causing the iron particles to be randomly disbursed in the fluid.

VISUALLY READABLE MAGNETIC CREDIT CARD STORAGE MEDIA

Filed Aug. 31, 1973